(12) United States Patent
Das et al.

(10) Patent No.: US 7,039,404 B2
(45) Date of Patent: May 2, 2006

(54) CONTINUOUS MOBILITY ACROSS WIRELESS NETWORKS BY INTEGRATING MOBILE IP AND GPRS MOBILITY AGENTS

(75) Inventors: Kaustubh Das, Hillsboro, OR (US); Prakash N. Iyer, Beaverton, OR (US); Changwen Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 10/184,310

(22) Filed: Jun. 27, 2002

(65) Prior Publication Data

US 2004/0203765 A1 Oct. 14, 2004

(51) Int. Cl.
*H04Q 7/20* (2006.01)
(52) U.S. Cl. .................. 455/435.1; 455/445; 370/351; 709/229
(58) Field of Classification Search ................ 455/433, 455/436, 432.1, 432.2, 432.3; 370/352
See application file for complete search history.

(56) References Cited

U.S. PATENT DOCUMENTS

| | | | | |
|---|---|---|---|---|
| 6,061,650 A | * | 5/2000 | Malkin et al. .............. | 704/228 |
| 6,289,377 B1 | * | 9/2001 | Lalwaney et al. .......... | 709/222 |
| 6,539,225 B1 | * | 3/2003 | Lee ............................. | 455/436 |
| 2002/0066036 A1 | * | 5/2002 | Makineni et al. ........... | 713/201 |
| 2002/0161905 A1 | * | 10/2002 | Haverinen et al. .......... | 709/229 |
| 2002/0181448 A1 | * | 12/2002 | Uskela et al. ............... | 370/352 |
| 2003/0053453 A1 | * | 3/2003 | Ono et al. ................... | 370/389 |

* cited by examiner

*Primary Examiner*—Sonny Trinh
*Assistant Examiner*—Phuoc Doan
(74) *Attorney, Agent, or Firm*—Blakely, Sokoloff, Taylor & Zafman LLP

(57) ABSTRACT

The present invention supports mobility for a mobile node between different packet data services. In one embodiment, the invention includes listening for a registration message from a mobile node at an external interface of a gateway node of a wireless packet service, the registration message containing a care-of address for the mobile node that is outside of the wireless packet service, accepting a registration message from the mobile node at the external interface, and registering the mobile node to the care-of address contained in the registration message. This embodiment further includes sending a registration reply message to the mobile node via the care-of address, the registration reply message indicating successful registration, creating a binding for the mobile node, tunneling packets addressed to the mobile node to the care-of address, and receiving tunneled packets from the mobile node, decapsulating the tunneled packets and sending them to the appropriate address.

43 Claims, 7 Drawing Sheets

CONTINUOUS MOBILITY ACROSS WIRELESS NETWORKS BY INTEGRATING MOBILE IP AND GPRS MOBILITY AGENTS

FIELD OF THE INVENTION

The present invention relates to the field of integrating mobility agents to provide wireless data services to mobile terminals across different wireless data networks. More particularly, the invention relates to maintaining continuous network connectivity by collocating a mobility agent with a gateway server in the home network.

BACKGROUND

GPRS (General Packet Radio Service) is a standard and an extension to the GSM (Global System for Mobile Communications) standards to provide wireless packet data services on GSM cellular networks. In GPRS, user data is served to each mobile node (MN) by a Serving GPRS Support Node (SGSN) that provides a wireless GSM compatible connection. The SGSN is an ingress router for the mobile node and the first routing element visible to the mobile node. Each SGSN is contained within a Public Land Mobile Network (PLMN) that may contain many SGSN's, each communicating with many different mobile nodes.

User data to and from the mobile node is transported in the PLMN over an IP (Internet Protocol) backbone with data units being tunneled over the backbone using a tunneling protocol called GPRS Tunneling Protocol (GTP). GTP runs between the SGSN's, and a Gateway GPRS Support Node (GGSN) and is carried as User Datagram Payload (UDP) over IP. The GGSN is an anchor and egress router in GPRS through which all packets flow. GTP provides seamless mobility for the mobile nodes between and within each PLMN in a GPRS system. All packets in a GPRS network flow between a GGSN and a SGSN with at least one SGSN being associated with a mobile node at all times.

Mobile Internet Protocol (Mobile IP or MIP, including MIPv4 and MIPv6) is an Internet Engineering Task Force (IETF) network layer protocol. MIPv4 is defined in RFC 3220 (Request for Comments) of the IETF (Internet Engineering Task Force) of the IAB (Internet Architecture Board). The standards for MIPv6 is currently in draft form and is soon to become an RFC. It is designed to allow seamless connectivity and TCP (or other connection oriented transport protocol) session maintenance when a mobile node moves from one LP subnet to another. MIPv4 uses two network infrastructure entities, a Home Agent (HA) and an optional Foreign Agent (FA), to deliver packets to the mobile node when it has left its home network. MITPv4 also supports point-of-attachment Care-of Addresses (CoA) if a FA is unavailable. Mobile IP is increasingly being deployed for 2.5/3G (2.5 or third generation wireless) provider networks.

It has been proposed that a Mobile IP Foreign Agent be located at each GGSN in a GPRS network in order to support movement by mobile nodes between GPRS and Mobile IP networks (see e.g. Technical Specification of the Third Generation Partnership Project 3GPP TS 23.923). A mobile node moving into a GPRS service area would find the Foreign Agent and perform a Mobile IP registration through the Foreign Agent. Data traffic with the mobile node can then be tunneled between the GPRS Foreign Agent and a conventional Home Agent in the mobile node's home network. For each consumer that wants application-transparent constant connectivity and reachability with respect to the consumer's home network, a Home Agent must be deployed in the consumer's home network.

This proposal further requires changes to GPRS standards and adds significantly to overhead on the network. The FA must constantly advertise its presence to incoming mobile nodes on the network adding to network overhead. In addition, the FA and the HA in the home network must always be active adding to processing demands. Further, the packet routing must be altered resulting in security and routing overhead going outside the PLMN to the mobile node's HA. As a result, proxy or gratuitous Address Resolution Protocol (ARP) must be performed by the HA to maintain reachability and connectivity. Moreover, the original GPRS mobility management must be replaced by Mobile IP-based mobility management even when the mobile node is in the PLMN. Accordingly, this scheme cannot be deployed in stages, since all GGSN's, SGSN's and mobile nodes must be changed to support the new mobility mechanism.

Finally, the system only works if both a Home Agent and a Foreign Agent can be provided for the mobile node. The Home Agent, now a single point of failure, is located outside the GPRS network and may therefore be outside the control of the GPRS operator. Foreign Agents also are not supported in MIPv6, so compatibility problems may arise with networks operating on MIPv6.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention allows a mobile node to move between a home wireless packet service into other wireless packet services and back again seamlessly and without loss of service. The mobile node remains reachable from other nodes at all times during the moves. The implementation is robust and causes little if any disruption to the configuration of the home service.

An embodiment of the invention will be described in the context of a mobile node with an operator's GPRS home service that can move into a wireless IP based access packet data network, such as a hotspot for 802.11 a or b (proposed standards for wireless local area networks developed by an Institute of Electrical and Electronic Engineers (IEEE) committee) and activate Mobile IP to retain transparent session persistence and reachability. However, it is applicable to many other types of wireless data networks.

In one example, a Mobile IP Home Agent is integrated with a Gateway GPRS Support Node (GGSN). The Home Agent maintains registrations and provides seamless connectivity to a mobile node that moves between the GPRS network and other wired or wireless networks, such as an 802.11 service, Bluetooth (a standard for short range wireless two-way radio monitored by the Bluetooth Special Interest Group), Wireless Ethernet, and other radio packet delivery systems as well as a full range of wired connections.

Embodiments of the invention apply to MIPv4 as well as MIPv6. MIPv6 (defined for IPv6) has several feature improvements over MIPv4. It retains the Home Agent (HA) but does not define or need a Foreign Agent (FA) to forward traffic from a mobile node's home subnet to a correspondent node (CN) in another subnet when the mobile node has changed its connection point to the network.

Figure 1A:
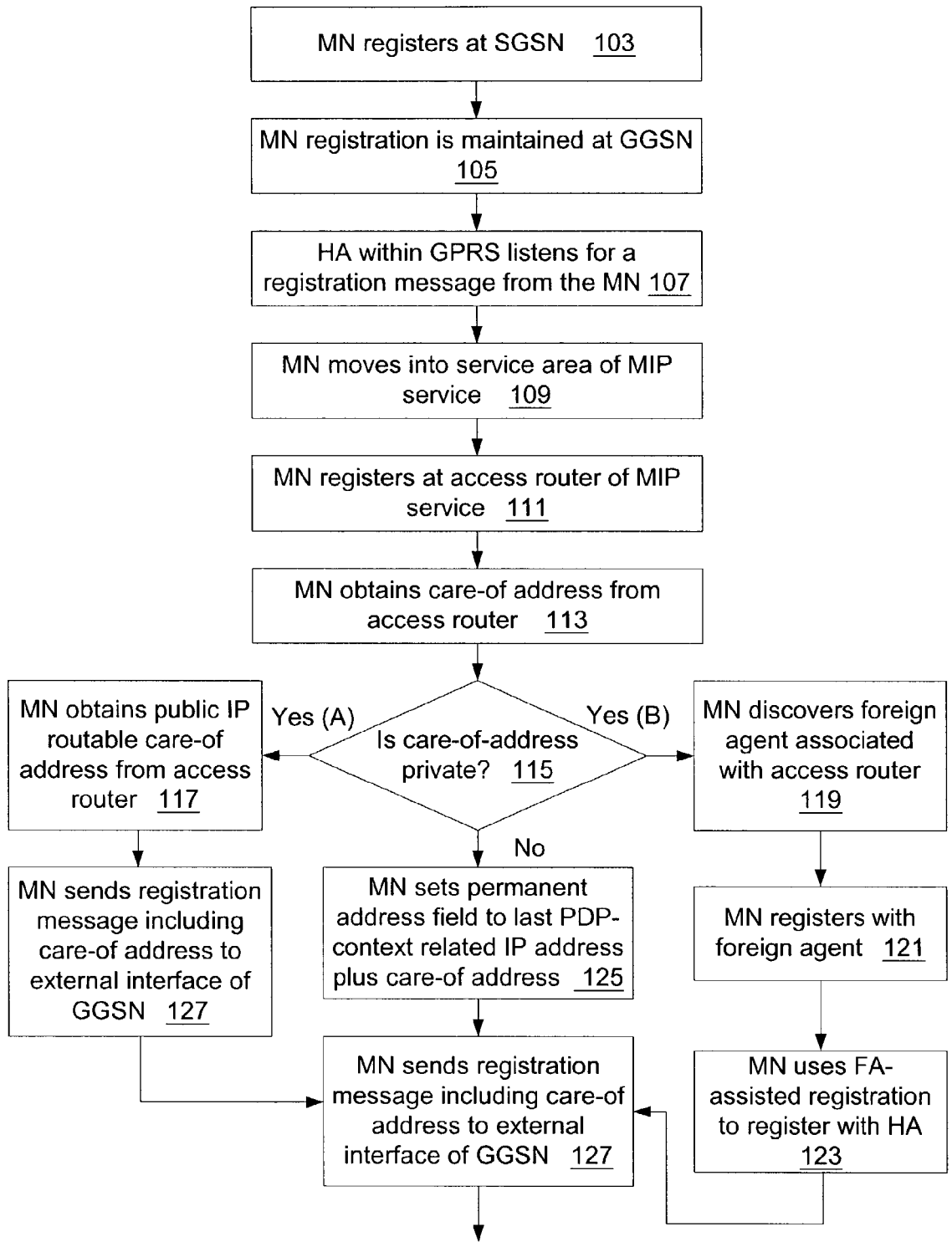
FIG. 1 is a flow diagram of a mobile node moving from one network to another according to one embodiment of the present invention.
Figure 1B:
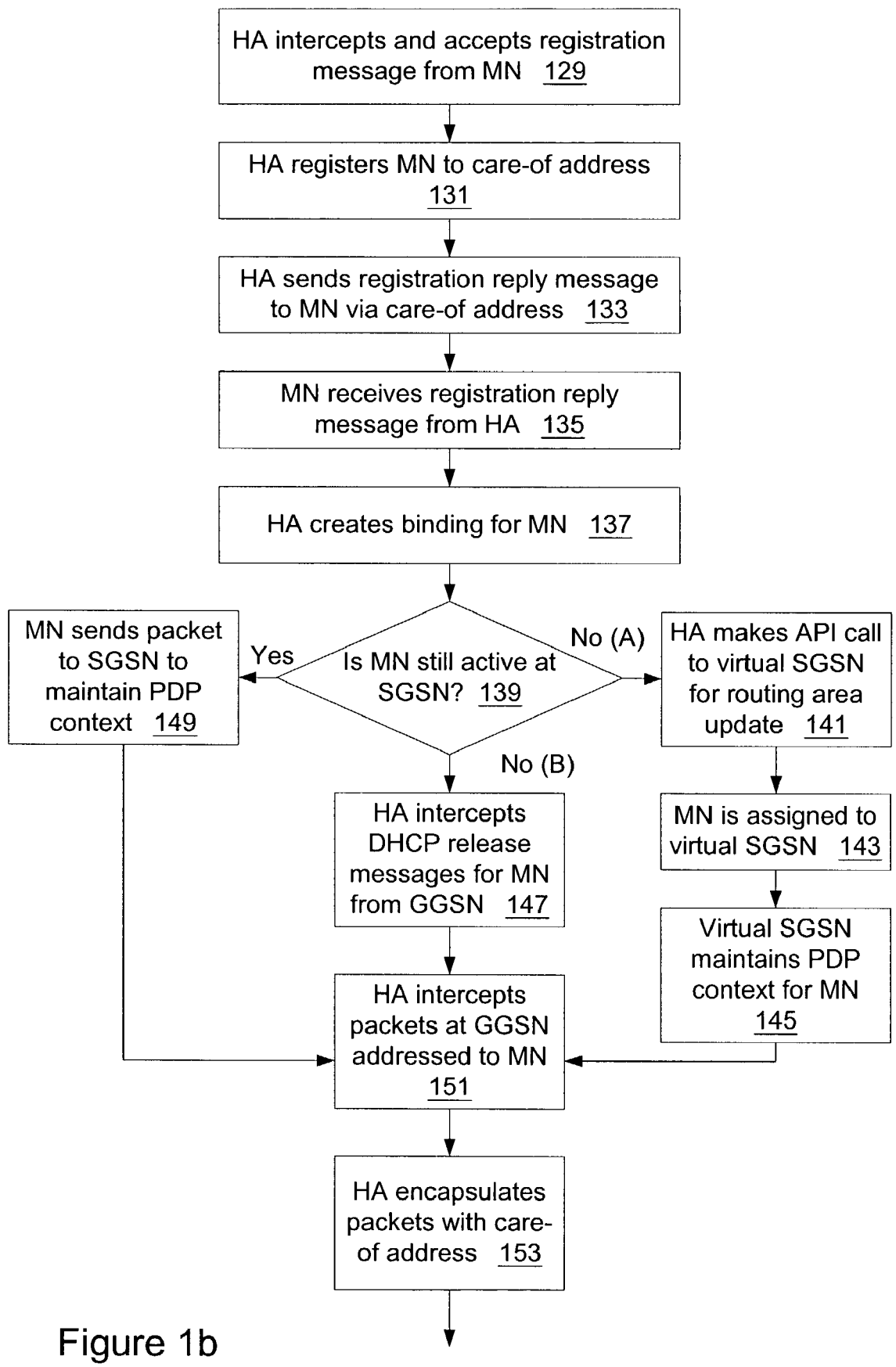
Figure 1C:
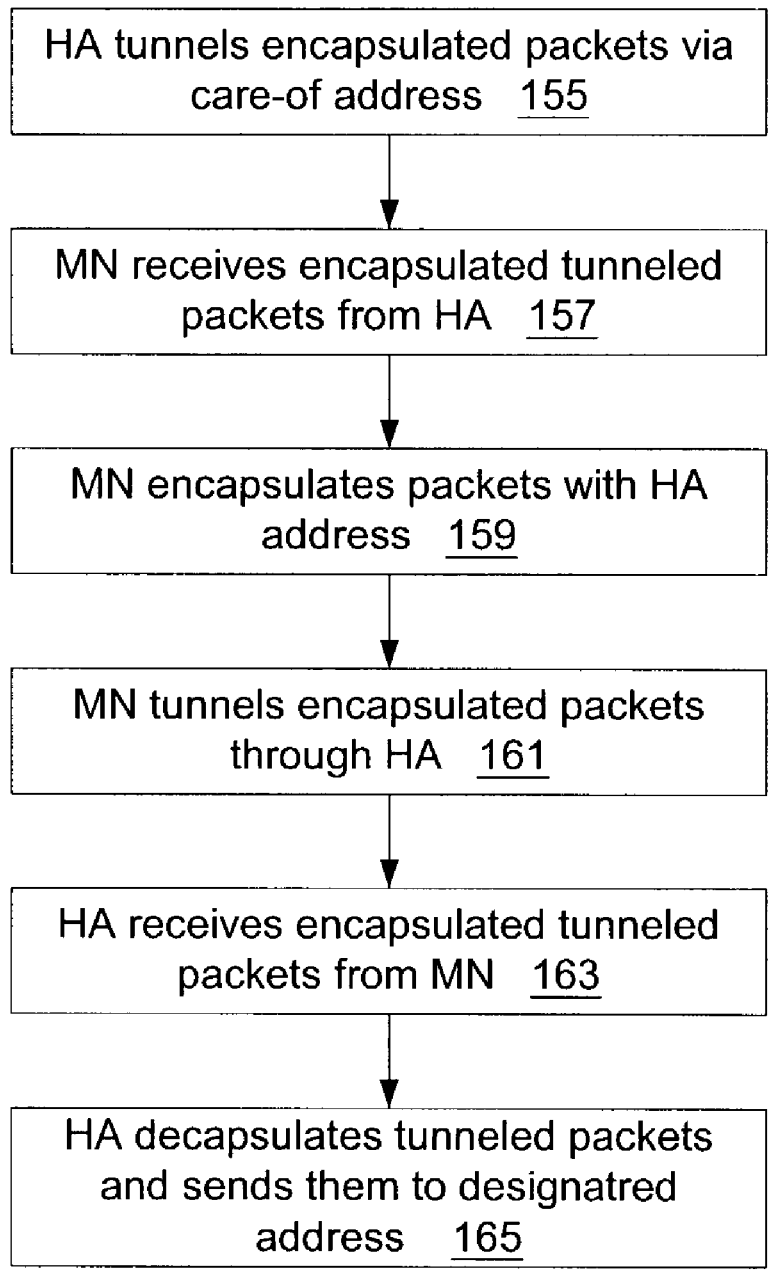

Referring to FIG. 1, a process suitable for implementing the present invention can be described. Initially the mobile node (MN) registers at a Serving GPRS Support Node (SGSN) 103. In GPRS, this is an attempt to activate a link by establishing a PDP (Packet Data Protocol) context. The mobile node link information (PDP context) is maintained at a corresponding Gateway GPRS Support Node (GGSN) 105. A simplified diagram showing a GPRS network near an 802.11 network is shown in FIG. 2.

Figure 2:
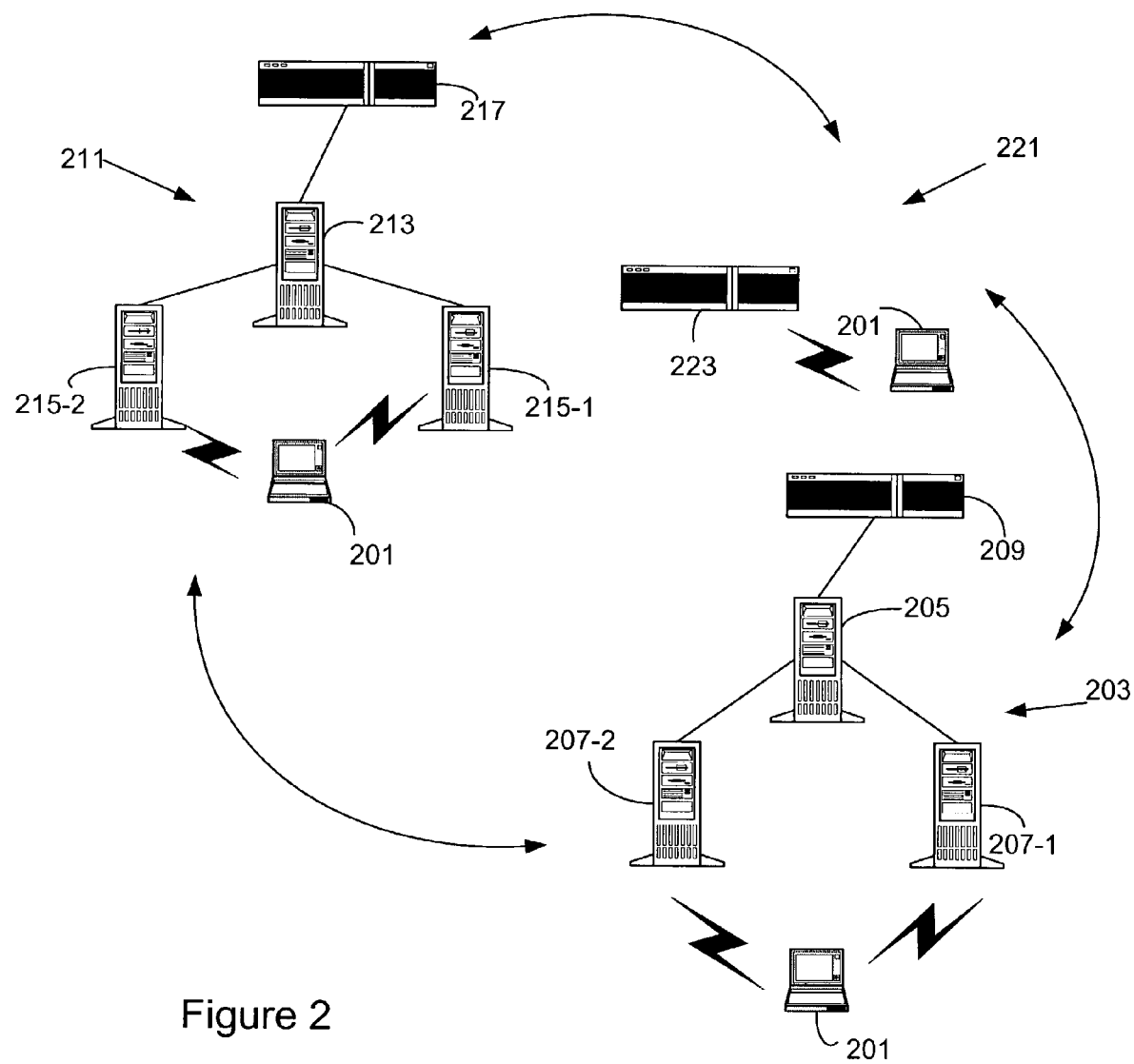
FIG. 2 is a block diagram of several nearby mobile networks suitable for implementing the present invention.

In FIG. 2, the mobile node 201 is shown in three different possible positions. The mobile node can be of a wide range of different types. It can be embodied in an external radio coupled to a portable computer or in a stand-alone device. Such devices can include a cellular telephone, or data messaging appliance, a plug-in card, such as a PCMCIA, MultiMedia or SDIO card, or an internal component that can connect to an internal bus, using, for example a Compact PCI, ISA (Industry Standard Architecture) connection, or internal motherboard bus. Any of these devices can be coupled to a computer, laptop or palmtop computer, PDA (personal digital assistant), web tablet or any other type of device for power and user interface functionality.

In one embodiment, the present invention can allow the mobile node to wander freely and seamlessly between the three positions shown in FIG. 2. One position is within a home GPRS network or PLMN 203. The home GPRS network contains a GGSN 205 coupled to multiple SGSN's 207-1, 207-2 and to a border router 209 that provides connectivity with other networks and the Internet. A second GPRS network is shown as a visitor PLMN 211, similar to the home PLMN. The mobile node in this PLMN would be a visitor. The visited PLMN also has a GGSN 213, multiple SGSN's 215-1, 215-2, and a border router 217. The GPRS networks are shown with a minimum of components to render the figure as simple as possible. Typically a PLMN will include many GGSNs, hundreds of SGSN's, and many border routers. It will also include many other components not shown to support name registers, client and billing information and telephony communications.

When a mobile node (sometimes called a mobile terminal) with GPRS capability is registered and active within a GPRS network, its movement can be accommodated by the GPRS mobility management scheme. This is based on GTP (GPRS Tunneling Protocol), which sends packets between the GGSN and the appropriate SGSN that is supporting the mobile node at the time. The GGSN routes the packets destined for a mobile node by looking up a previously established Packet Data Protocol (PDP) context, which among other things tells the GGSN the location of the SGSN servicing the mobile node. The mobile node can wander throughout the GPRS network or PLMN and into other GPRS networks or PLMN's provided by other service providers. This mobility is all handled by and within the design considerations of the GPRS mobility management scheme based on GTP.

While embodiments of the present invention are described in the context of a GPRS system, the invention is not limited to such systems. The GGSN may be replaced by any type of gateway and embodiments of the present invention apply particularly to enhanced gateway support nodes that support heterogeneous roaming. One example of a gateway support node other than a GGSN but where the same concepts may be applied is a PDSN (Packet Data Serving Node). A PDSN is a gateway router in a CDMA 2000 (Code Division Multiple Access 2000, an International Telecommunication Union (ITU) standard for wireless cellular packet data) based 3GPP2 (Third Generation Wireless Partnership Project 2) mobility framework. In addition, reference will be made to various interfaces such as those known in GPRS as Gn, Gp, and Gi interfaces. The specific nature of the interfaces is not essential to the present invention and a great variety of other interfaces may also be used.

In addition to the PLMN's, FIG. 2 shows a very simple-short range wireless subnetwork 221, such as an 802.11 hotspot. This simplified subnetwork contains only an access router 223. The subnetwork can be much larger and more complicated than that shown and it can rely on any one of a variety of different standards. In each of the networks of FIG. 2, the communicating entities are shown simply as nodes in order to emphasize the link layer which is important to the present invention. Each node also includes a physical layer (not shown) involving wireless and wired links with air interfaces and the accompanying baseband and radio frequency or infrared hardware.

When the mobile node wanders into the subnetwork, the connection with the GPRS system would normally be broken, the PDP context lost and the user would become unreachable until it reestablishes a connection through the subnetwork. GPRS has a mobility management scheme that is effective within and between GPRS networks. However, GPRS GTP and native GPRS MM protocols are generally not preferred for mobility management between GPRS and networks outside of a PLMN with a different access technology, such as 802.11, Bluctooth, Ethernet etc.

In the illustrated embodiment of the invention, the GGSN of the home network includes a Mobile IP Home Agent which listens for a registration message from the mobile node 107. This is done independently of the normal functions of the GPRS system and without injecting any overhead or control channel messages into the GPRS system. As long as no registration messages are received, the GPRS system, including the GGSN, SGSN, border router and the mobile node function in a conventional manner as is well known in the art. When the mobile node roams from its home GPRS network into an 802.11 hotspot or any other type of wireless radio network 109, it can attempt to establish a link to the other network 111.

In many cases, this network will be a service that supports Mobile IP, however, Mobile IP is not required in the present invention. In many networks, a link will be established by registering at an access router or server of the outside network 111. The mobile node may choose the new network's access medium either because the 802.11 interface is preferred over GPRS or because the GPRS connection has been lost. The preference may be due to better error rates, better data rates, more favorable pricing, or any other reason.

Upon connecting to the new network, through registration, the mobile node will be assigned a care-of address (COA) 113. This is usually done by the local DHCP (Dynamic Host Configuration Protocol) service. In addition, Mobile IP can be activated, at the home network because the home agent, collocated at the GGSN, supports Mobile IP. The care-of address can then be evaluated to determine whether it is a public address or a private address 115.

Ultimately, the mobile node will register (using e.g. Mobile IP registration ) the care-of address at its Home Agent at the GGSN so that it can remain connected and be reachable with the outside world from the 802.11 hotspot through the GGSN. To do this, the address must be one that the Home Agent can reach. By public, it is meant that the care-of address is globally routable and hence reachable from the Home Agent. A private address is one that cannot be addressed globally. Typically, the private address will be behind a NAT (Network Address Translation) or firewall or it will be a temporarily assigned address. The determination as to whether the received care-of address is public or private 115 can be made in many different ways and it can be made by the mobile node or through communication with the Home Agent using processes known in the art.

In many networks, the mobile node will be given a public care-of address. In a typical simple network, the care-of address will be an address for a DHCP server that is collocated with the access router 223. The mobile node can then send 127 a Mobile IP registration packet back to its Home Agent that is collocated with the GGSN 205. This packet can have the permanent address field set to the mobile node's last PDP-context related IP address from the GPRS system and its current care-of address from the 802.11 hotspot 125.

If the acquired care-of address is private, the mobile node 201 can request a public IP routable address from the access router 223. If, for example, the access router runs NAT (Network Address Translation) then it should be able to provide some form of public address 117. The mobile node can specify that as its care-of address. Alternatively the HA can realize that the MN has a private care-of address and figure out the public address to use by comparing the care-of address specified with the source IP address of the registration message. It can then use the source IP address in the registration message as the care-of address. The mobile node can then encapsulate its Mobile IP data packets to its Home Agent in UDP (User Datagram Protocol) to facilitate NAPT traversal. The Home Agent will intercept the encapsulated tunneled packets at the GGSN, terminate the tunnel and decapsulate the UDP encapsulated IP packets. The mobile node can therefore using any one or more of the approaches mentioned above send its registration message to its Home Agent 127.

As an alternative way of providing a connection back to its Home Agent, the mobile node may discover a Mobile IP Foreign Agent in the hotspot 119. The Foreign Agent could be collocated with the access router or provided as a separate router. A Mobile IP Foreign Agent advertises its presence to the network at regular intervals, allowing it to be easily discovered by devices entering the network. The Foreign Agent will normally have a routable public address and the mobile node can attempt to register via the Foreign Agent 211. The Foreign Agent address can be used as a care-of address as mentioned above, or the mobile node can use a collocated address to register with its Home Agent 123, using, for example, MIP registration. The Foreign Agent can be used to advantage to quickly establish connectivity with a Home Agent. Typically it has 2 basic functions, to support multiple Mobile Nodes with one or a small number of routable IPv4 addresses and to provide local AAA (Authentication, Authorization, Accounting) services. However, Foreign Agents are not applicable to Mobile IPv6.

Once a public IP routable care-of address or a Foreign Agent address has been registered in a Mobile IP binding, the Home Agent can intercept and forward data to the mobile node. The Home Agent collocated with the GGSN, as mentioned above, listens to external traffic received by the GGSN and intercepts any registration messages. Upon receiving the registration request 129, the HA can process the request by binding the mobile node to the care-of address 131. It can then send a registration reply message back to the mobile node using the care-of address 133. The HA in this process can also create a binding for the mobile node 137 for use in the networks. The binding associates a home address with the care-of address and a lifetime for the association.

After registration, the Home Agent can start to intercept traffic destined for the mobile node and tunnel traffic to the mobile node's designated care-of address. The reception of this traffic at the GGSN will typically depend upon maintaining the mobile node's registration with its home PLMN. If the permanent address given to the mobile node is reassigned to another mobile node while Mobile IP is active, then packets may be lost or misdirected.

One simple way to maintain connectivity with the PLMN is for the mobile node to occasionally send packets to its assigned SGSN using the GPRS protocols 149. If the hotspot is within the GPRS coverage area and the GPRS link is kept active while the mobile node is in the 802.11 hotspot, then GPRS protocols will ensure that the PDP context is kept alive. As a result, the address given to the mobile node will not be reassigned to any other nodes. The Home Agent, upon determining that the mobile node is still active 139, can simply create a binding for the mobile node and tunnel packets destined for the mobile node to the mobile node's care-of address. As mentioned above, the HA sends 133 a registration reply to the mobile node, perhaps via the FA collocated with the access router, telling the mobile node that the registration has been successful.

If the mobile node is not still active at its assigned SGSN 139, then the GPRS interface can be deactivated. This may happen because the mobile node terminates its session or registration with the PLMN or because the mobile node has roamed out of the network coverage area or is in some dormant power managed state. The deactivation of the GPRS interface can be detected by the HA by accessing information from the GGSN or this information can be sent to the HA from the mobile node. In either case, the HA can take steps to maintain the PDP context state even when the mobile node is not active on the network. Maintaining the PDP context allows packets to be routed to the GGSN at the mobile node's last address. From the GGSN, they can be intercepted by the HA and tunneled to the mobile node to maintain connectivity.

In one embodiment of the invention, a virtual SGSN is collocated with the GGSN. The virtual SGSN appears to the GPRS network like any other SGSN except that it does not send or receive packets and it does not terminate inactive subscribers. A mobile node assigned to the virtual SGSN will appear to be active on the network. The HA can then employ the virtual SGSN to fool the GGSN into believing that the mobile node has moved to the virtual SGSN when, in actuality, it has moved out of the PLMN. This is a very elegant and non-disruptive way to keep the PDP context alive. In this embodiment of the invention, the registration request message from the mobile node and the subsequent registration process trigger an API (application programming interface) call from the HA to the virtual SGSN, indicating a "routing area update request" from the mobile node 141. The virtual SGSN accepts the mobile node update, which is then assigned to the virtual SGSN 143. The virtual node, in turn, reactivates the PDP context with the GGSN, preserving the "permanent" IP address 145.

In another embodiment of the invention, the mobile node permanent address may be preserved by intercepting and dropping DHCP (Dynamic Host Configuration Protocol) release messages at the GGSN for Mobile IP registered mobile nodes 147. The DHCP release messages are provided in GPRS to allow inactive mobile nodes to be dropped. Dropping inactive mobile nodes conserves network resources. In other types of networks other messages perform a similar function. Since the Home Agent can listen to messages on the GGSN, it can intercept any messages or spoof any messages as necessary to keep the PDP context alive. By intercepting the release messages, the HA can prevent the GGSN from dropping the mobile node in response to them. This interception process allows for mobility outside the network without making any changes to the existing protocols of the network.

With the PDP context alive and the mobile node Mobile IP registered with a care-of address, communication can occur at the remote network consistent with the specifications of Mobile IP or any other standard for data communications consistent with the structure of the particular subnetwork. The HA collocated with the GGSN creates a binding for the mobile node and starts to tunnel packets destined for the mobile node to its care-of address. The HA first intercepts packets at the GGSN that are addressed to the mobile node 151. The HA encapsulates the intercepted packets within an UDP packet, if needed for NAPT traversal. The HA then tunnels the packets to the care-of address 155. This can be the address of the access router, the foreign agent or a combination of public and private IP addresses The mobile node receives these possibly encapsulated tunneled packets from the HA 157 through the appropriate tunneling mechanisms and routers. The mobile node can also encapsulate packets, if needed for NAPT traversal, addressed to a correspondent node which may be outside of both networks 159. The mobile node then tunnels the possibly encapsulated packets to the address of its HA 161. The HA receives the (possibly encapsulated) tunneled packets from the mobile node 163, decapsulates (if needed) the tunneled packets and sends them to the designated external address 165. To be sent to the external address, the packets can be routed through the GGSN's external connections. The packets may be intended for another node on the GPRS network. In this case, they will include an appropriate address. The HA, upon detunneling the tunneled packets, can route them through the GGSN to the appropriate SGSN for the intended addressee.

For all of this data traffic, the GGSN operates in accordance with conventional standards as set forth in the various standards for GSM and GPRS. When the GGSN receives a datagram addressed to a mobile node, it searches for an existing PDP context to determine the location of a SGSN serving the addressed mobile node. In embodiments of the present invention, these datagrams are then intercepted before they reach the SGSN. Similarly, when the GGSN receives a datagram addressed to an external device, it will send the datagram to the external device through its border router. In embodiments of the present invention, some of these packets can be decapsulated packets from the HA.

When the mobile node returns to its home network, which in this case is the GPRS network, the regular Mobile IP procedures trigger a deregistration with the HA. Regular routing area update protocols of GPRS cause SGSN context request messages to be communicated to the virtual SGSN where the mobile node is registered. As a result, the PDP context is updated. When the mobile node enters the PLMN, it will be reassingned to an appropriate SGSN from the virtual SGSN through further routing area update alls.

Embodiments of the invention may be understood in terms of the eventual packet outing under different circumstances. When the mobile node is in the PLMN, packets to and from other mobile nodes in the PLMN flow as follows:

MN→SGSN→GGSN→SGSN→MN

When the mobile node is in the PLMN, packets to and from a correspondent node (CN) in a PDN (Public Data Network) flow as follows:

MN→SGSN→GGSN→Internet→CN

Since, according to standards for GPRS, all packets necessarily go through the GGSN, collocating a HA and a virtual SGSN with the GGSN allows the mobile node to roam outside the PLMN and still remain connected and reachable both from within and outside the PLMN. Mobile IP can be used to enable roaming between a GPRS network and another network, such as an 802.11 hotspot. With the HA in the GGSN, packet traffic when the mobile node is in the PLMN follows the path shown above, which is the same path as in a conventional GPRS network. When the mobile node leaves the PLMN, enters hotspot and registers, for example with MIP, the packet traffic will look a little different.

When the mobile node is outside the PLMN, packets to and from other mobile nodes in the PLMN flow as follows:

MN→FA/Access Router→HA/GGSN→SGSN→MN

When the mobile node is outside the PLMN, packets to and from a correspondent node in a PDN (Public Data Network) flow as follows:

MN→FA/Access Router→HA/
  GGSN→Internet→CN

Embodiments of the present invention enable seamless and continuous mobility between GPRS and other access technologies. At the same time, session continuity is maintained for protocols running on top of IP. These benefits apply regardless of whether GPRS devices are roaming in and out of 802.11 hotspots or in and out of other types of networks.

In addition, unlike a conventional Home Agent or Foreign Agent, the Home Agent of the present invention never needs to advertise its presence to the network. In some embodiments of the present invention, the HA only listens for and accepts registration messages on the external interface of the GGSN. It does not need to perform proxy or gratuitous ARP (Address Resolution Protocol) like typical HA's, relying instead on GPRS routing to intercept packets. The HA only needs to become operational when the mobile node is outside the GPRS network. When the mobile node is within the GPRS network, packet routing and mobility management can occur exactly as in the GPRS spec. Furthermore, the collocated HA can support an arbitrary number of IP subnets, limited only by the CPU, memory and other limitations of the GGSN.

Embodiments of the present invention allow seamless IP mobility for GPRS devices to extend to all wired and wireless networks. In doing so, GPRS mobility mechanisms can be preserved and used almost intact. No extra overhead for IP mobility is introduced within the GPRS network. The changes to the GGSN maintain full compatibility with existing GPRS protocols, making the changes robust and very easy to deploy. The changes can also be deployed in stages. The operator of the GPRS PLMN can introduce the changes in a single GGSN first and phase in the solution to other PLMN's as demand increases and time and resources allow. In addition, there are fewer components in the network infrastructure to manage than if a Foreign Agent were hosted by the GGSN. Unlike systems which rely on Foreign Agents, embodiments of the present invention scale well when networks, including cellular networks, go to all IP. They also support the transition to IPV6 and MIPv6, which do not include Foreign Agents.

Figure 3:
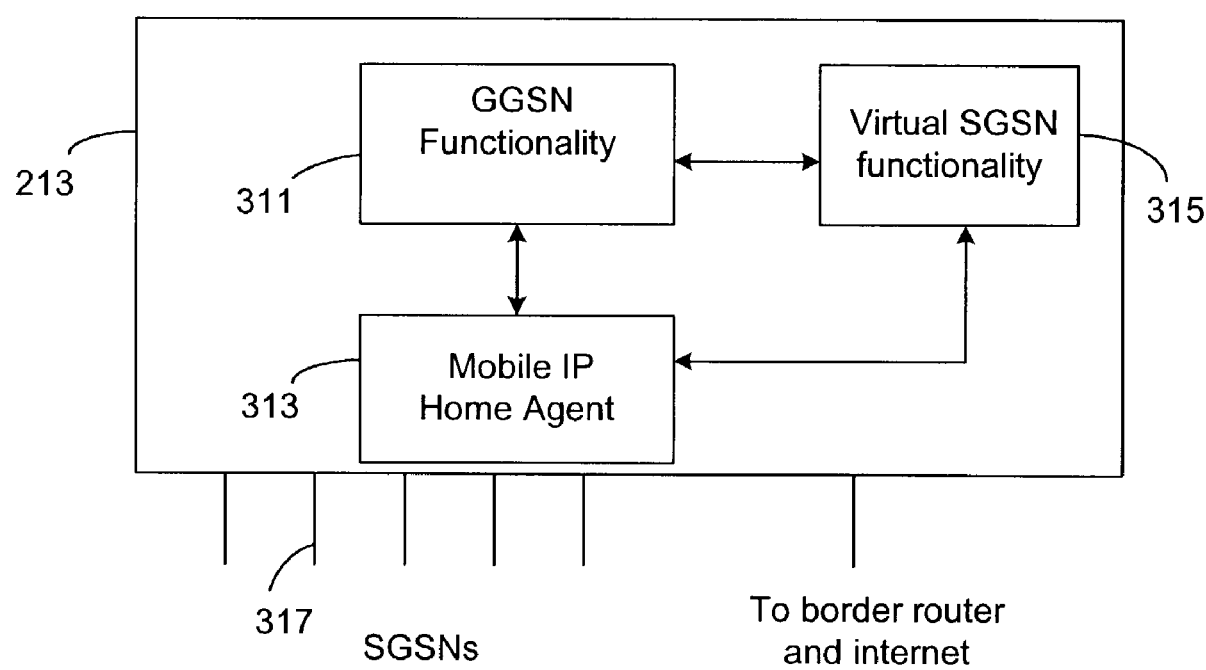
FIG. 3 is a block diagram of a gateway server with a collocated Home Agent suitable for implementing the present invention.
Figure 4:
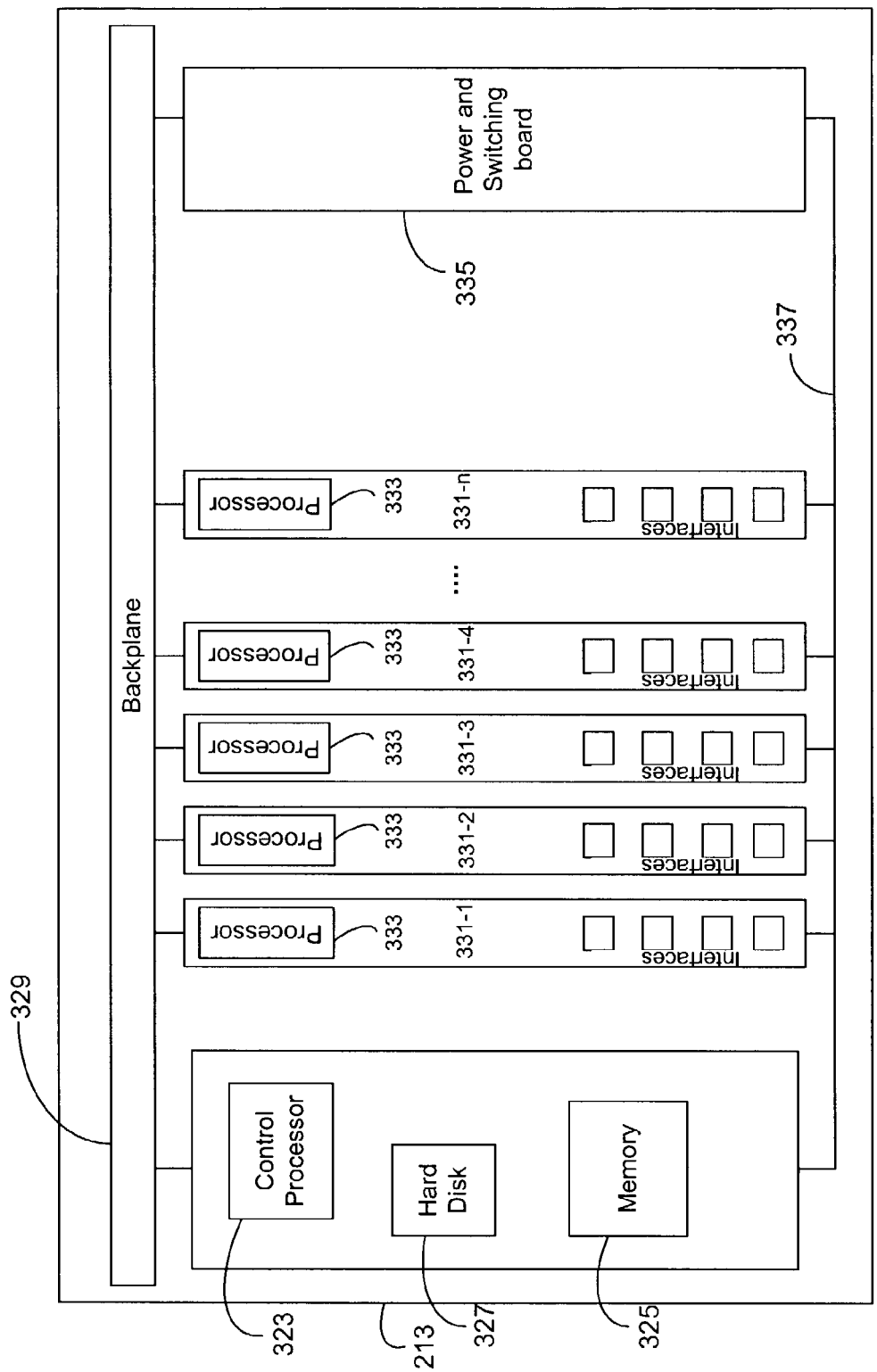
FIG. 4 is a block diagram of the gateway server of FIG. 3 from a hardware perspective.

FIGS. 3 and 4 depict an example of a gateway server 213. The gateway server includes several different modules and interfaces as shown in FIG. 3 that can be implemented in hardware such as that shown in FIG. 4. The illustrated embodiment of the gateway server is shown as an example only. There are many other structures possible for the gateway server, which may or may not include some of the features shown. The modules and components may be fully integrated into fewer components than illustrated. The gateway server 213, as mentioned above, can be a Gateway GPRS Support Node (GGSN) or any other type of gateway server for wireless packet data services. In the illustrated embodiment, the gateway server includes its regular GGSN functionality 311 coupled to a collocated Mobile IP Home Agent 313. In addition, a virtual Serving GPRS Support Node (SGSN) is coupled to both the GGSN and the Home Agent. All three modules can be implemented in software with calls, hooks or API's (Application Programming Interface) to allow the modules to interconnect.

The GGSN includes a set of interfaces 317 to other SGSN's 207, 215 which support mobile users 201 in the network. As mentioned above, these can be implemented as GTP interfaces through routers over an IP backbone. In addition, there is an interface to border routers 209, 217 through which the network can access the Internet. The Home Agent is coupled to the SGSN interfaces and to the border router interface in order to intercept packets as discussed above. It is also coupled to the virtual SGSN to bind mobile nodes to the virtual SGSN as discussed in more detail above.

FIG. 4 shows the GGSN of FIG. 3 from a hardware perspective. The gateway server can be implemented as a conventional server coupled to mobile wireless systems or it can be implemented based on a wireless telephony platform. The gateway server 213 includes a bus or other communication means 321 for communicating information, and a control processor such as a microprocessor 323 coupled with the bus for processing information.

The gateway server further includes a main memory 325, such as a random access memory (RAM) or other dynamic data storage device, coupled to the bus for storing information and instructions to be executed by the processor. The main memory also may be used for storing temporary variables or other intermediate information during execution of instructions by the processor.

The gateway server may also include a nonvolatile memory, such as a read only memory (ROM) or other static data storage device coupled to the bus or incorporated into the control processor for storing static information and instructions for the processor. A mass memory 327 such as a magnetic disk or optical disk and its corresponding drive may also be coupled to the bus of the gateway server for storing information and instructions.

The gateway server can also be coupled via the bus to user interface equipment (not shown) such as a display device or monitor, a cathode ray tube (CRT), or Liquid Crystal Display (LCD), for displaying information to a system administrator. For example, graphical and textual indications of installation status, operations status and other information may be presented to the administrator on the display device. Typically, an alphanumeric input device, such as a keyboard with alphanumeric, function and other keys, may be coupled to the bus for communicating information and command selections to the processor. A cursor control input device, such as a mouse, a trackball, or cursor direction keys can be coupled to the bus for communicating direction information and command selections to the processor and to control cursor movement on the display.

The bus is coupled to a backplane 329 or other high speed communications interface. The backplane supports a series of interface boards 331-1 to 331-n with control, data management, and switching through the backplane. The interface boards implement the interfaces to SGSN's and border routers as shown in FIG. 3. In a telephony architecture, the boards are removable, replaceable and interchangeable without disturbing system operation. Each board includes its own processing elements 333 and one or more interfaces 335. The processing elements are coupled to the bus and handle control, data conversion and switching as received over the backplane. The processing elements may be microprocessors, DSPs, ASICs or FPGAs depending on the particular design or application.

Other communication devices may be coupled to the bus or the backplane such as a modem, a network interface card, or other well known interface devices, such as those used for coupling to Ethernet, token ring, or other types of physical attachment for purposes of providing a communication link to support a local or wide area network (LAN or WAN), for example. These devices may be connected to the backplane as additional interface boards or to the bus in other ways not shown. In this manner, the gateway server may also be coupled to a number of clients or servers via a conventional network infrastructure, including an intranet or the Internet, for example.

The gateway server also has a power and switching board 335 coupled to the backplane 329 as well as to a power bus 337. The power and switching board provides power to all of the interface boards, the backplane and the main processor board through the power bus. It can also be used to switch the interface boards on and off.

It is to be appreciated that a lesser or more equipped gateway server than the examples described above may be preferred for certain implementations. Therefore, the configuration of the gateway server will vary from implementation to implementation depending upon numerous factors, such as price constraints, performance requirements, technological improvements, or other circumstances.

Figure 5:
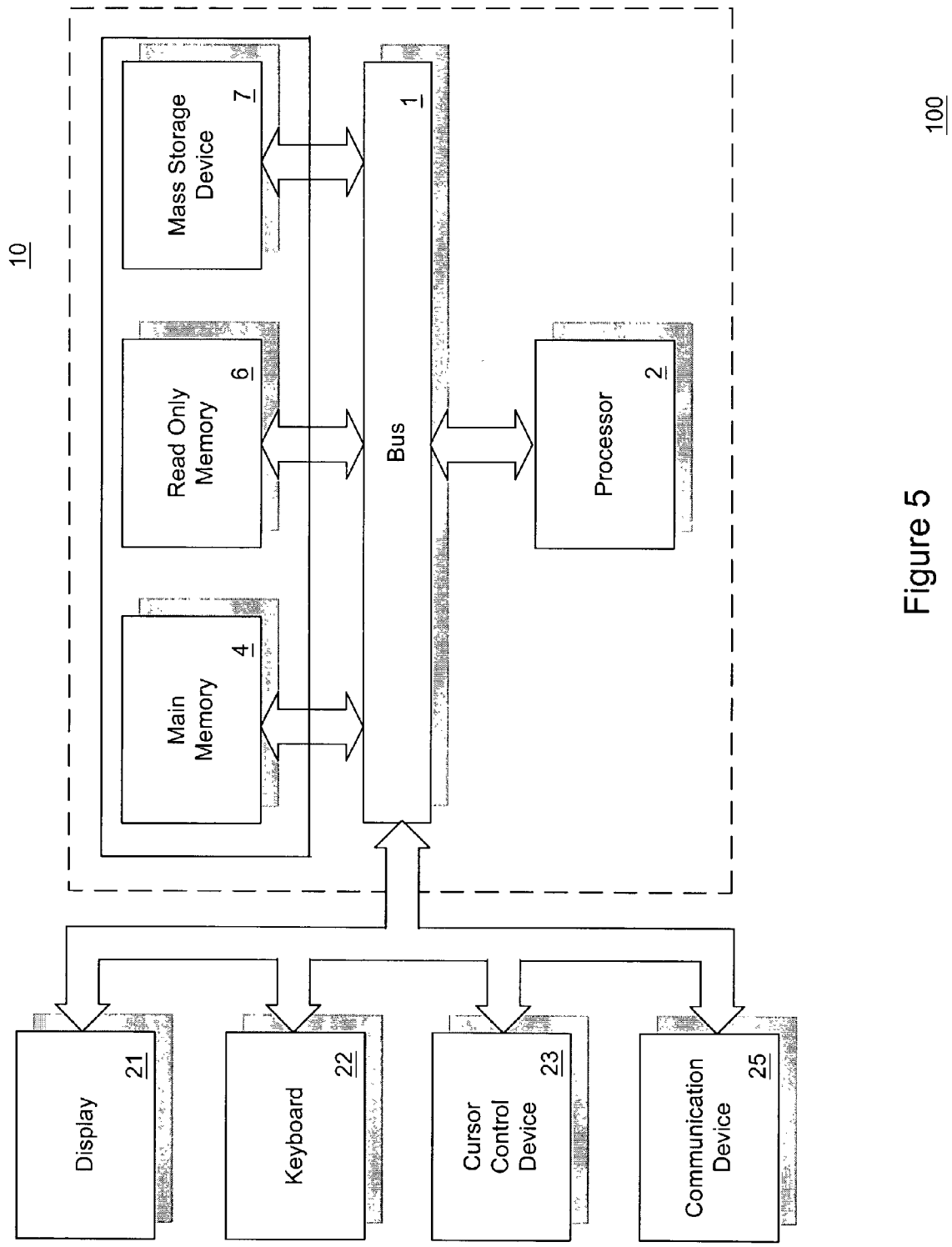
FIG. 5 is a block diagram of a mobile node suitable for implementing the present invention.

FIG. 5 shows a computer system 10 representing an example of a system that can be used as mobile node 201 as depicted in, for example FIG. 2. The mobile node can be implemented as a desktop or portable machine. It can also be implemented in one or more small portable platforms such as laptops, PDA's (Personal Digital Assistant), wireless web devices such as personal stereos, telephones and integrated messaging systems, and other devices. The mobile node includes a bus or other communication means 1 for communicating information, and a processing means such as a microprocessor 2 coupled with the bus 1 for processing information.

The mobile node further includes a main memory 4, such as a random access memory (RAM) or other dynamic data storage device, coupled to the bus 1 for storing information and instructions to be executed by the processor 2. The main memory also may be used for storing temporary variables or other intermediate information during execution of instructions by the processor.

The mobile node may also include a nonvolatile memory 6, such as a read only memory (ROM) or other static data storage device coupled to the bus for storing static information and instructions for the processor. A mass memory 7 such as a magnetic disk or optical disk and its corresponding drive may also be coupled to the bus of the mobile node for storing information and instructions.

The mobile node can also be coupled via the bus to a display device or monitor 21, such as a cathode ray tube (CRT) or Liquid Crystal Display (LCD), for displaying information to a user. For example, graphical or text messages, web clippings and other data may be presented to the user on the display device. Typically, an alphanumeric input device 22, such as a keyboard with alphanumeric, function and other keys, may be coupled to the bus for communicating information and command selections to the processor. A cursor control input device 23, such as a mouse, a trackball, cursor direction keys or stylus pad can be coupled to the bus for communicating direction information and command selections to the processor and to control cursor movement on the display 21. A microphone 24 and speaker 25 can also be connected to the bus for communications purposes or to play back any received sounds.

A radio or other communications device 25 is also coupled to the bus 1. The radio subsystem can be coupled to the mobile node in any of a variety of other ways including PCMCIA, MultiMedia, SDIO card, Compact PCI, ISA (Industry Standard Architecture), and an internal motherboard bus. The radio may also be a separate device, connected to the computer by cabling or similar electrical interface. The specific interconnection of the radio subsystem to the rest of the mobile node does not affect the fundamental operation of the invention. There may be one communications device capable of communicating with several different networks or several communications devices each dedicated to a particular network.

Other communication devices may also be coupled to the bus such as a modem, a network interface card, or other well known interface devices, such as those used for coupling to Ethernet, token ring, or other types of physical attachment for purposes of providing a communication link to support a local or wide area network (LAN or WAN), for example. In this manner, the mobile node may also be coupled to a number of clients or servers via a conventional network infrastructure, including an intranet or the Internet, for example.

It is to be appreciated that a lesser or more equipped mobile node and computer system than the example described above may be preferred for certain implementations. Therefore, the configuration of the mobile node will vary from implementation to implementation depending upon numerous factors, such as price constraints, performance requirements, technological improvements, or other circumstances.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media / machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a mobile node moving between a GPRS system and an 802.11 hotspot, it can be applied to a wide variety of mobile radio systems and mobile radios that use a gateway-server type architecture. Such systems include digital cellular, WCDMA, cellular digital packet data and many other digital wireless packet data systems. The mobile node may be any of a variety of mobile wireless devices, including data-enabled telephones and messaging systems, PDA's, web-powered video and stereo systems and transportable computers coupled to data radios. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:

registering at serving node of a wireless packet service and establishing a context, including a home address with the wireless packet service;

listening for a registration message from a mobile node at an external interface of the gateway node of the wireless packet service, the registration message containing a care-of address for the mobile node that is outside of the wireless packet service and the home address from the registration with the serving node of the wireless packet service;

accepting a registration message from the mobile node at the external interface;

registering the mobile node to the care-of address contained in the registration message;

sending a registration reply message to the mobile node via the care-of address, the registration reply message indicating successful registration;

creating a binding for the mobile node that connects the home address with the care-of address;

tunneling packets addressed to the mobile node at the home address to the care-of address; and receiving tunneled packets from the mobile node at the care-of address, decapsulating the tunneled packets and sending them to the appropriate address.

2. The method of claim 1, wherein listening, accepting, registering sending, encapsulating and receiving are performed by a home agent collocated with the gateway node.

3. The method of claim 1, further comprising intercepting, from the gateway node, packets addressed to the mobile node at the home address, and tunneling the intercepted packets to the care-of address of the mobile node based on the binding created for the mobile node.

4. The method of claim 1, wherein the care-of address is an address of an access router.

5. The method of claim 4, wherein sending a registration reply message comprises sending a Mobile IP registration reply message via a foreign agent collocated with the access server.

6. The method of claim 1, wherein the mobile node is assigned to a serving node before accepting the registration message, and wherein creating a binding comprises creating a Mobile IP binding, the method further comprising assigning the mobile node from the assigned serving node to a virtual serving node in association with creating a Mobile IP binding for the mobile node to the care-of address.

7. The method of claim 6, wherein the virtual serving node maintains a PDP context for the mobile node without serving any packets to the mobile node.

8. The method of claim 7, wherein assigning the mobile node comprises making an API call to the virtual serving node to indicate a routing area update request.

9. The method of claim 1, further comprising intercepting release messages from the gateway node in association with registering the mobile node to the care-of address.

10. The method of claim 9, wherein the mobile node is assigned to a serving node before accepting the registration message, and the release messages are to cancel the mobile node's assignment to the serving node.

11. The method of claim 9, wherein the release messages are Dynamic Host Configuration Protocol release messages generated by the gateway node to cancel a PDP context for the mobile node.

12. A machine-readable medium having stored thereon data representing instructions which, when executed by a machine, cause the machine to perform operations comprising:

registering at serving node of a wireless packet service and establishing a context, including a home address with the wireless packet service;

listening for a registration message from a mobile node at an external interface of the gateway node of the wireless packet service, the registration message containing a care-of address for the mobile node that is outside of the wireless packet service and the home address from the registration with the serving node of the wireless packet service;

accepting a registration message from the mobile node at the external interface;

registering the mobile node to the care-of address contained in the registration message;

sending a registration reply message to the mobile node via the care-of address, the registration reply message indicating successful registration;

creating a binding for the mobile node tat connects the home address with the care-of address;

tunneling packets addressed to the mobile node at the home address to the care-of address; and receiving tunneled packets from the mobile node at the care-of address, decapsulating the tunneled packets and sending them to the appropriate address.

13. The medium of claim 12, further comprising instructions which, when executed by the machine, cause the machine to perform further operations comprising intercepting, from the gateway node, packets addressed to the mobile node at the home address, and tunneling the intercepted packets to the care-of address of the mobile node based on the binding created for the mobile node.

14. The medium of claim 12, wherein the mobile node is assigned to a serving node before accepting the registration message, the instruction further comprising instructions which, when executed by the machine, cause the machine to perform further operations comprising assigning the mobile node from the assigned serving node to a virtual serving node in association with registering the mobile node to the care-of address.

15. An apparatus comprising:

a serving node of a wireless packet service to register a mobile node and to establish a context including a home address with the wireless packet service;

a gateway node of the wireless packet service; and a home agent colocated with the gateway node to listen for a registration message from a mobile node at the external interface, the registration message containing a care-of address for the mobile node that is outside of the wireless packet service and the home address from the registration with the serving node of the wireless packet service, to accept a registration message from the mobile node at the external interface, to register the mobile node to the care-of address contained in the registration message, to send a registration reply message to the mobile node via the care-of address, the registration reply message indicating successful registration, to create a binding for the mobile node that connects the home address with the care-of address, to tunnel packets addressed to the mobile node at the home address to the care-of address, and to receive tunneled packets from the mobile node, decapsulate the tunneled packets and send them to the appropriate address.

16. The apparatus of claim 15, wherein the care-of address is an address of an external access router.

17. The apparatus of claim 15, further comprising a virtual serving node and wherein the mobile node is assigned to a serving node before accepting the registration message, the home agent further enabling the assignment of the mobile node from the assigned serving node to the virtual serving node in association with creating a binding for the mobile node to the care-of address.

18. The apparatus of claim 17, wherein the virtual serving node maintains a PDP context for the mobile node without serving any packets to the mobile node.

19. A method comprising:

registering a mobile node at a server node of a first wireless packet service, the registration establishing a context, including a home address with the wireless packet service;

registering the mobile node at an access router of a second wireless packet service;

obtaining a care-of address from the access router;

sending a registration message to a home agent associated with the first wireless packet service, the registration message including the care-of address and the home address from the registration with the serving node of the first wireless packet service;

receiving a registration reply message from the home agent, tunneling to the home agent, packets for transmission from the mobile node;

receiving tunneled packets from the home agent at the mobile node.

20. The method of claim 19, wherein the borne agent is permanently assigned to the mobile node.

21. The method of claim 19, wherein the home agent is collocated with a gateway server node of the first wireless packet service.

22. The method of claim 19, further comprising maintaining the registration with the first wireless packet service by sending packets in accordance with protocols of the first wireless packet service.

23. The method of claim 22, wherein maintaining the registration comprises maintaining a PDP context of the first wireless packet service.

24. The method of claim 19, wherein tunneling the packets comprises encapsulating the packets destined to the last PDP-context related IP address from the first wireless packet service within an IP packet destined to the care-of address.

25. The method of claim 24, wherein the last PDP-context related IP address comprises a permanent address field of the mobile node.

26. The method of claim 19, wherein obtaining a care-of address comprises obtaining a public IP routable public address from the access router and using the IP routable public address as the care-of address.

27. The method of claim 19, wherein registering at an access router of a second wireless packet service comprises discovering a foreign agent associated with the access router and registering with the discovered foreign agent and wherein sending a registration message to a home agent comprises using foreign-agent-assisted mobile IP registration.

28. The method of claim 27, wherein the foreign agent is collocated with the access router.

29. The method of claim 19, wherein the tunneled packets are structured in accordance with a Mobile Internet Protocol.

30. The method of claim 19, further comprising moving from the service area of the first wireless packet service after registering at the server node and moving into the service area of the second wireless packet service after registering at the access router.

31. A machine-readable medium having stored thereon data representing instructions which, when executed by a machine, cause the machine to perform operations comprising:

registering a mobile node at a server node of a first wireless packet service, the registration establishing a context, including a home address with the wireless packet service;

registering the mobile node at an access router of a second wireless packet service;

obtaining a care-of address from the access router;

sending a registration message to a home agent associated with the first wireless packet service, the registration message including the care-of address and the home address from the registration with the serving node of the first wireless packet service;

receiving a registration reply message from the home agent, tunneling to the home agent, packets for transmission from the mobile node;

receiving tunneled packets from the home agent at the mobile node.

32. The medium of claim 31, further comprising instructions which, when executed by the machine, cause the machine to perform further operations comprising maintaining the registration with the first wireless packet service by sending packets in accordance with protocols of the first wireless packet service.

33. The medium of claim 32, wherein maintaining the registration comprises maintaining a PDP context of the first wireless packet service.

34. The medium of claim 31, wherein the home address is the last PDP-context related IP address from the first wireless packet service, and wherein the instructions for tunneling the packets comprise instructions which, when executed by the machine, cause the machine to perform further operations comprising tunneling the packets destined to the last PDP-context related IP address from the first wireless packet service to the care-of address.

35. The medium of claim 31, wherein the instructions for registering at an access router of a second wireless packet service comprise instructions which, when executed by the machine, cause the machine to perform further operations comprising discovering a foreign agent associated with the access router and performing mobile IP registration through the discovered foreign agent and wherein instructions for sending a registration message to a home agent comprise instructions which, when executed by the machine, cause the machine to perform further operations comprising using foreign-agent-assisted mobile IP registration.

36. An apparatus comprising:

a communications device to register at a serving node of a first wireless packet service and to and establish a context, including a home address with the wireless packet service;

a communications device to register at an access router of a second wireless packet service;

a memory containing instruction containing instructions for registration and communication with the wireless packet services; and a processor coupled to the communications device and the memory to obtain a care-of address from the access router, to send a registration message to a home agent associated with the first wireless packet service, the registration message including the care-of address and the home address from the registration with the serving node of the wireless packet service, to receive a registration reply message from the home agent, to tunnel packets for transmission to the home agent, and to receive tunneled packets from the home agent.

37. The apparatus of claim 36, wherein the processor further maintains the registration with the first wireless packet service by sending packets through the communications device in accordance with protocols of the first wireless packet service.

38. The apparatus of claim 37, wherein maintaining the registration maintains a PDP context of the first wireless packet service related to the home address.

39. The apparatus of claim 36, wherein the processor tunnels the packets by encapsulating the packets destined to the last PDP-context related IP address from the first wireless packet service within an IP packet destined to the care-of address.

40. The apparatus of claim 39, wherein the last PDP-context related IP address comprises a permanent address field of the apparatus.

41. A wireless packet service system comprising:

a gateway node;

an external interface of the gateway node;

a plurality of serving nodes, each coupled to the gateway node and to which mobile nodes are assigned, the mobile node assignments including a context with a home address to the wireless packet service system;

a home agent to listen for a registration message from a mobile node at the external interface, the registration message containing a care-of address for the mobile node that is outside of the wireless packet service and the home address from the registration with the serving node of the wireless packet service, to accept a registration message from the mobile node at the external interface, to register the mobile node to the care-of address contained in the registration message, to send a registration reply message to the mobile node via the care-of address, the registration reply message indicating successful registration, to create a binding for the mobile node that connects the home address with the care-of address, to tunnel packets addressed to the mobile node at the home address to the care-of address, and to receive tunneled packets from the mobile node, decapsulate the tunneled packets and send them to the appropriate address; and a virtual serving node of the wireless packet service coupled to the gateway node to accept an assignment of a mobile node from a serving node in association with creating the binding for the mobile node to the care-of address.

42. The apparatus of claim 41, wherein the care-of address is an address of an external access router.

43. The apparatus of claim 41, wherein the virtual serving node maintains a PDP context including the home address for the mobile node without serving any packets to the mobile node.

* * * * *